(12) United States Patent
Eric

(10) Patent No.: US 8,449,046 B2
(45) Date of Patent: May 28, 2013

(54) TWO-STAGE MASTER BRAKE CYLINDER

(76) Inventor: Siegrist Eric, Wiarton (CA)

( * ) Notice: Subject to any disclaimer, the term of this patent is extended or adjusted under 35 U.S.C. 154(b) by 631 days.

(21) Appl. No.: 12/597,588

(22) PCT Filed: Apr. 25, 2008

(86) PCT No.: PCT/CA2008/000783
§ 371 (c)(1),
(2), (4) Date: Oct. 26, 2009

(87) PCT Pub. No.: WO2008/131538
PCT Pub. Date: Nov. 6, 2008

(65) Prior Publication Data
US 2010/0117446 A1 May 13, 2010

(30) Foreign Application Priority Data
Apr. 27, 2007 (CA) ..................... 2586533

(51) Int. Cl.
*B60T 11/08* (2006.01)
*B60T 11/224* (2006.01)
*B60T 15/16* (2006.01)

(52) U.S. Cl.
CPC ............. *B60T 11/224* (2013.01); *B60T 15/16* (2013.01)
USPC ............................... 303/14; 60/578

(58) Field of Classification Search
USPC ................. 303/14; 60/578; 188/167
See application file for complete search history.

(56) References Cited

U.S. PATENT DOCUMENTS

| | | | | | |
|---|---|---|---|---|---|
| 2,291,056 A | * | 7/1942 | Pallady | .......................... | 60/578 |
| 2,508,403 A | * | 5/1950 | Knauss | ........................... | 60/576 |
| 3,174,285 A | * | 3/1965 | Stelzer | ............................ | 60/549 |
| 3,635,028 A | * | 1/1972 | Sherman | ........................ | 60/578 |
| 4,345,674 A | * | 8/1982 | Vacval | ........................... | 188/71.8 |
| 4,703,623 A | * | 11/1987 | Dalibout et al. | ................ | 60/577 |
| 6,082,831 A | * | 7/2000 | Hageman et al. | .......... | 303/115.2 |

* cited by examiner

Primary Examiner — Robert A Siconolfi
Assistant Examiner — Stephen Bowes

(57) ABSTRACT

A two stage master brake cylinder uses a primary and secondary piston to displace an initial large volume of hydraulic fluid during a first stage and a second stage that continues brake actuation by displacing a reduced volume of hydraulic fluid determined by the secondary piston. A by-pass control valve is adjustable to vary transition from the first stage to the second stage.

8 Claims, 19 Drawing Sheets

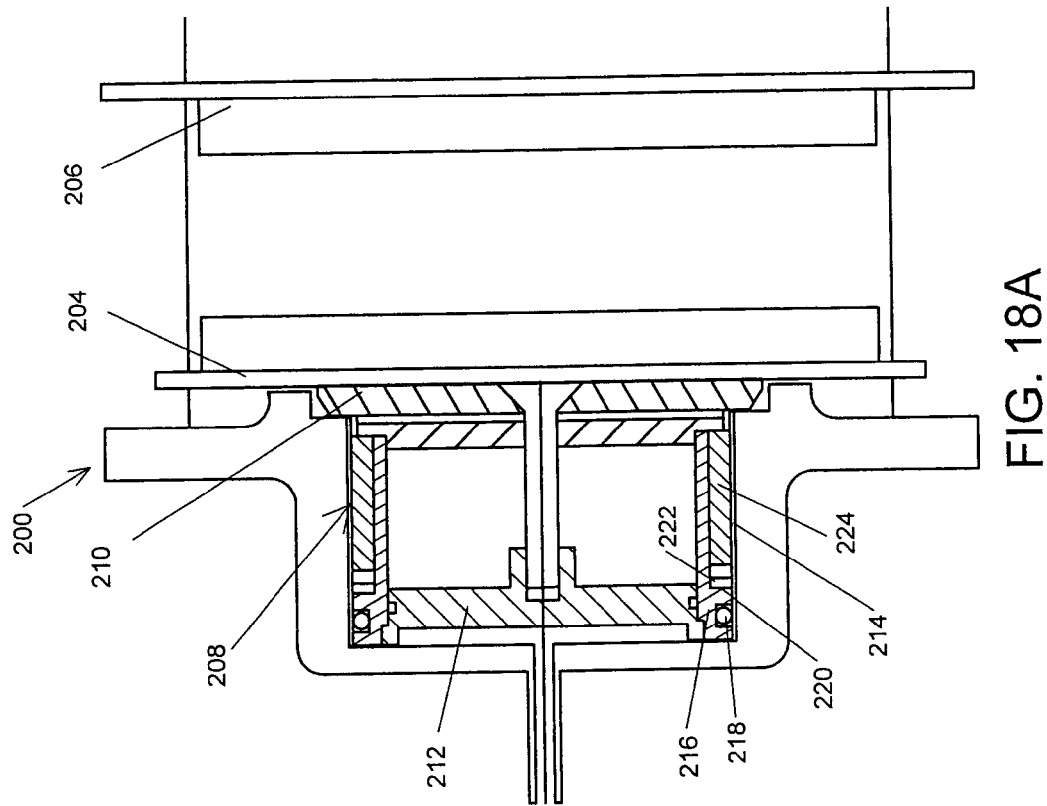
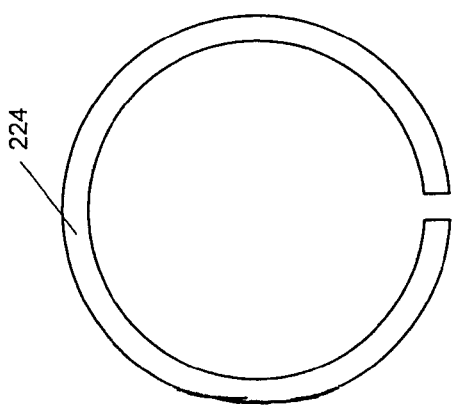

TWO-STAGE MASTER BRAKE CYLINDER

BACKGROUND OF THE INVENTION

The present invention relates to a two-stage master cylinder for initially providing a large volume of braking fluid for actuation of brake cylinders and a second stage for finer control after a certain pressure has been reached.

For most brake applications two single piston calipers are controlled by one master brake cylinder. In demanding brake environments additional brake cylinders at the caliper are used to increase the force exerted on the brake pad and these additional cylinders increase the volume of braking fluid that must be provided under pressure by the master cylinder. The larger volume of brake fluid can be provided by a larger piston in the master cylinder however once the brakes are applied such a large piston does not have the degree of feel and the actual force that an operator must exert on a large piston is relatively high. These factors control the range of brake pedal travel and determine the force that an operator must exert on the brake pedal. If a small piston is used the brake pedal travel distance is greater, however the actual force the operator must exert on the brake pedal is reduced. If a large piston is used in the master cylinder the extent of movement of the brake pedal is reduced but the force exerted by the operator is increased.

The present invention overcomes a number of these problems and provides a system that allows adjustment of the forces that occur during brake actuation and control of the brake pedal travel distance.

SUMMARY OF THE INVENTION

A two stage master cylinder according to the present invention includes a primary piston and a secondary piston that are moved by a push actuator. During the first stage movement of the push actuator moves the primary and secondary pistons and displaces through an outlet of the master cylinder, a large volume of hydraulic fluid. A by-pass control valve is associated with the primary piston and automatically opens a vent path at a predetermined pressure at the outlet to define the second stage of operation. Further movement of the push actuator moves both pistons with only movement of the secondary piston increasing hydraulic pressure and/or movement of hydraulic fluid through the outlet.

BRIEF DESCRIPTION OF THE DRAWINGS

Preferred embodiments of the invention are shown in the drawings wherein:

FIG. 18*a* and FIG. 18*b* show details of a brake caliper; and

DETAILED DESCRIPTION OF THE PREFERRED EMBODIMENTS

Figure 1:
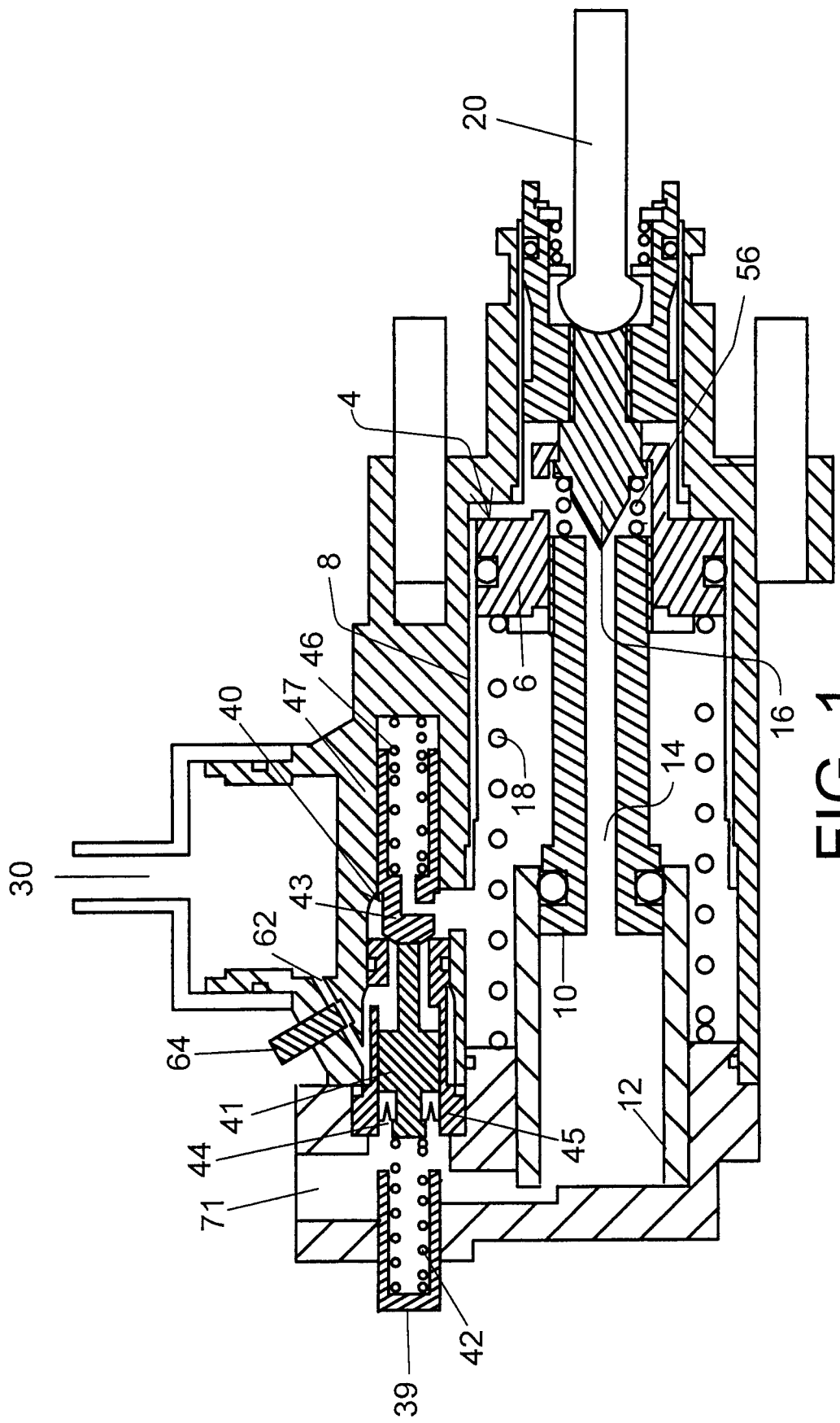
FIG. 1 is a vertical sectional view through the master cylinder having a two-stage piston design without a force being applied to the master cylinder.

The two stage master cylinder 2 shown in FIG. 1 includes a piston assembly 4 having a large (primary) piston 6 sliding within cylinder 8 and a small (secondary) piston 10 sliding in cylinder 12. The small piston 10 includes an open center port 14 that can be selectively closed by the needle valve 16.

The small piston 10 is coaxial with the large piston 6 and moves with the large piston. With the needle valve in an open position, both pistons are not under pressure. The push rod 20 is connected to the brake actuator and is shown in FIG. 1 in a non actuating state. The needle valve 16 is biased by the valve release spring 56 to a clear position. Brake fluid can pass through the port 14 of the small piston and find its way through the outlet 30 to the brake reservoir. This particular flow path is shown as 50 in the horizontal section of FIG. 2. The large piston 6 is biased by the spring 18 to the one end of the master cylinder. Hydraulic fluid can flow through the valve 80 to the rear side of the large piston 6 on the return stroke.

Figure 5:
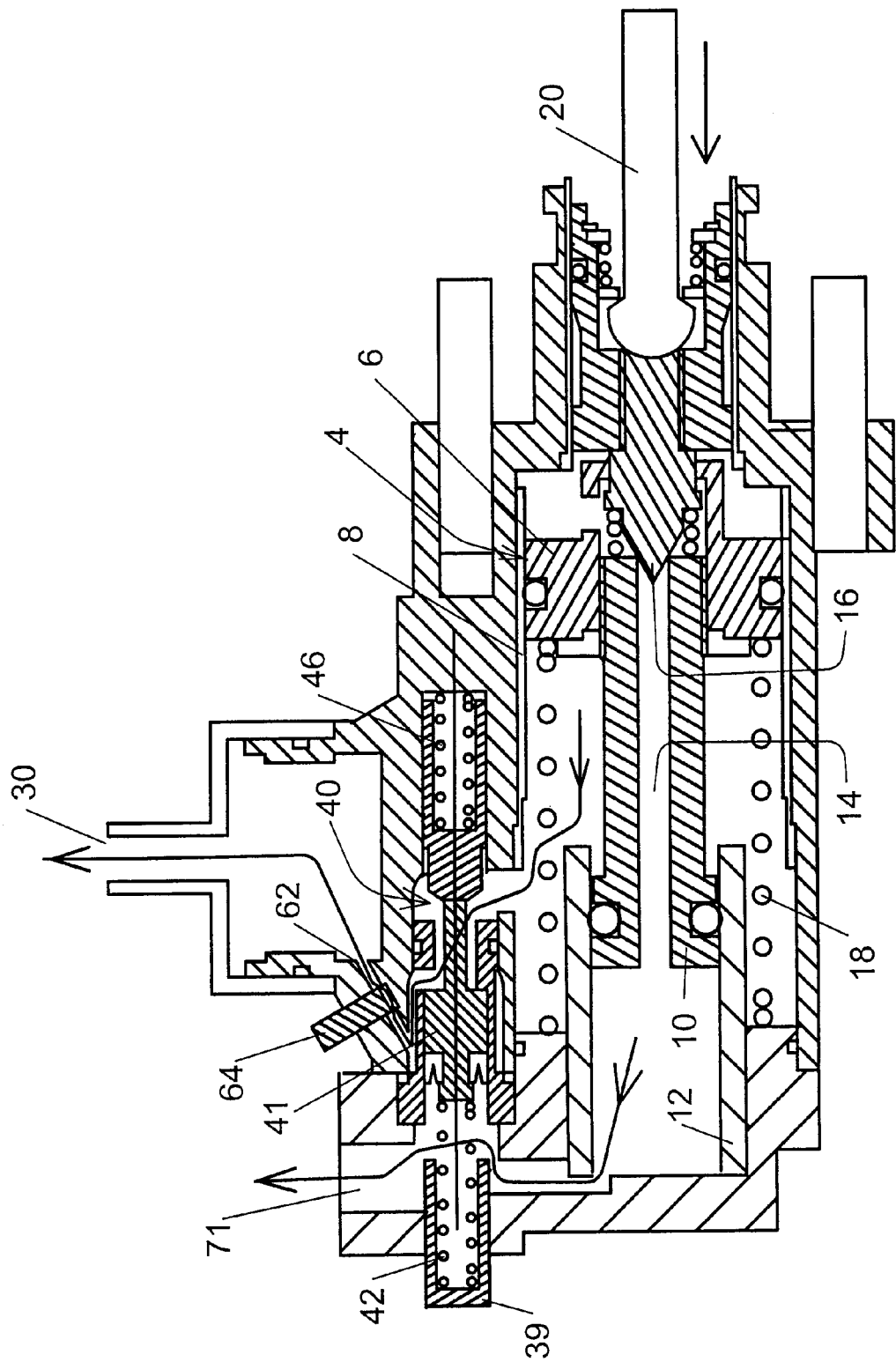
FIG. 5 is a vertical section through the master brake cylinder where a preset pressure has been established in the brake cylinder and the effect of the large piston is now being bypassed.

FIG. 1 also includes the bypass control valve 40 in the form of a two diameter spool valve having a large head 41 having a pressure face exposed to the braking pressure at outlet 71. The large head 41 slides within the cylinder 45 and the small head 43 slides within the cylinder 47. The bypass control valve 40 is moveable within these cylinders from the closed position of FIG. 1 to an open position as shown in FIG. 5. The small head 43, in the position of FIG. 1, closes the bypass control valve 40 and when closed isolates the large piston 6 from the vent channel 62 connected to the reservoir outlet 30. In FIG. 5 the spool valve has moved to the right and opened the rear side of the large piston 6 to the reservoir through the vent channel 62 creating a pressure actuated by-pass associated with the large piston 6. This vent channel preferably includes an adjustable modulator valve located to restrict the vent channel.

The bypass control valve 40 is biased by a primary spring 46 to the closed position as shown in FIG. 1. An adjusting spring 42 exerts a pressure on the large head 41. The adjusting spring counteracts to a certain extent the primary spring 46 and allows adjustment of the pressure at which the control valve moves to the by-pass position. Basically, the pressure face 44 of the large head 41 is exposed to the braking pressure at outlet 71. The opposite face of head 41 is exposed to a reduced pressure (pressure of the reservoir) when the small head closes the bypass control valve 40. The rear face 48 of the small head 41 is always exposed to the pressure associated with the primary piston 6. This pressure partially counteracts the pressure exerted on the pressure face 44 of the large head 41 creating a bias force tending to open the bypass control valve 40. Both of the front and rear surfaces of head 41, once the smaller head has opened the bypass control valve 40, are exposed to pressure but a pressure differential exists as the bypass control valve is now open and bleeds off fluid to the reservoir. This is shown in FIG. 5. At a certain pressure at outlet 71, the bypass control valve will move into the position shown in FIG. 5 overcoming the spring bias force urging the bypass control valve to close.

Figure 2:
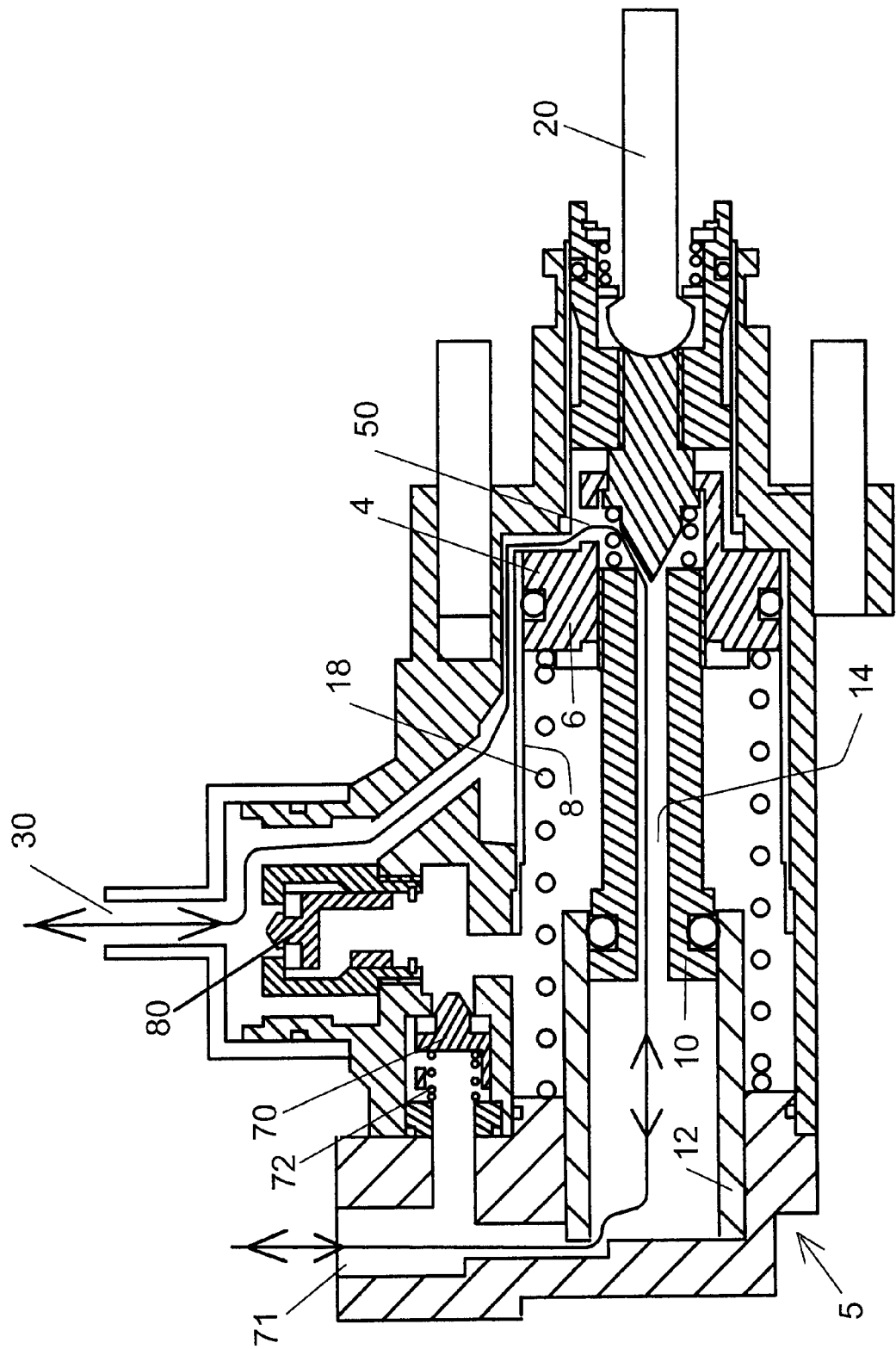
FIG. 2 is a horizontal section through the brake cylinder in the condition of FIG. 1.
Figure 3:
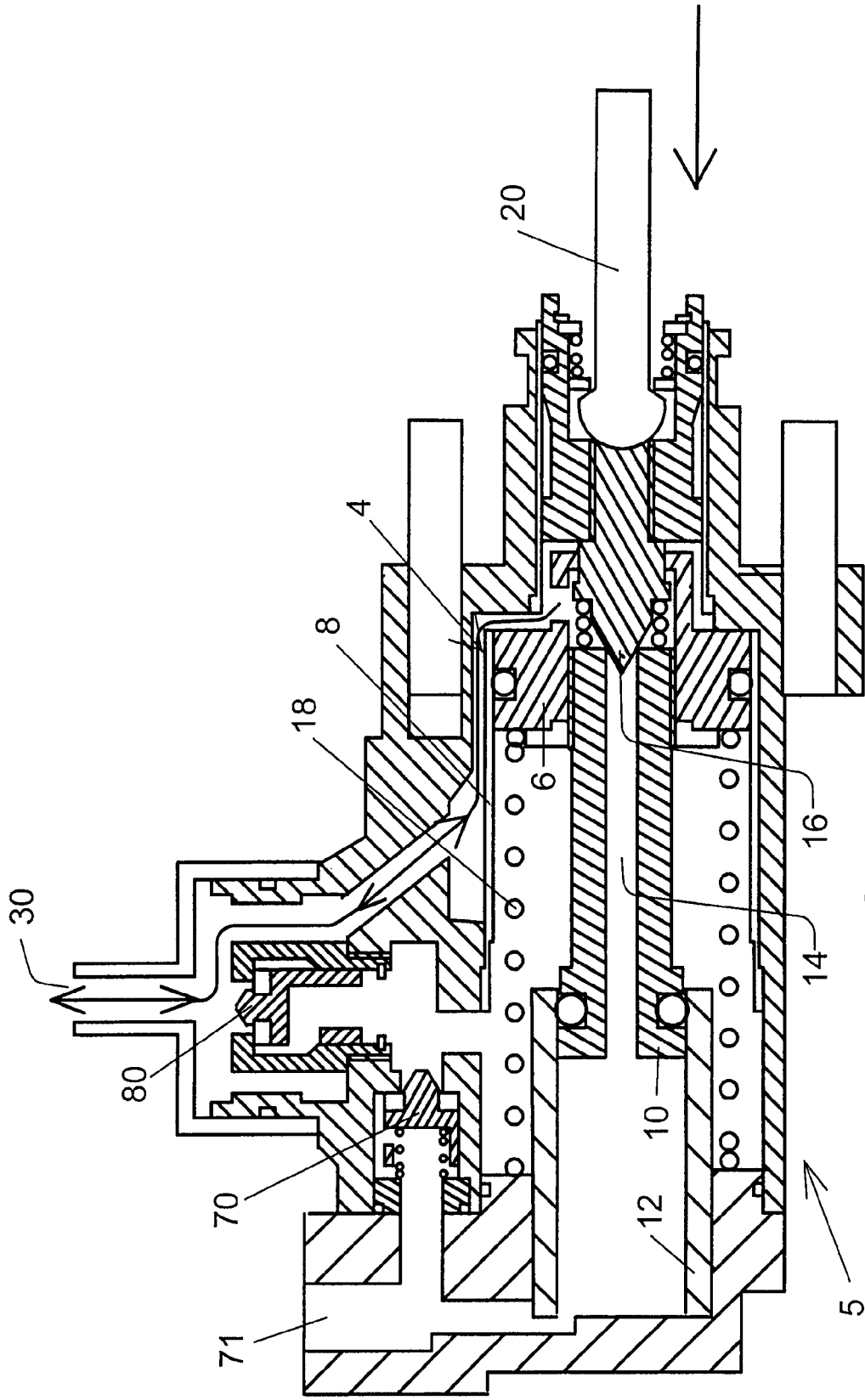
FIG. 3 is a horizontal section through the master cylinder with the push rod closing a needle valve associated with the piston assembly.

The horizontal sectional view of FIG. 2 shows the valve member 70 which is biased by spring 72 to a closed position as shown in FIG. 2. As the piston assembly 4 moves due to the movement of the push rod 20, as shown in FIGS. 3 and 5, a pressure on the backside of the large piston 6 moves valve 72 to an open position and provides hydraulic fluid to the brake piston cylinders through outlet 71. Both pistons initially act and provide a high volume of hydraulic fluid with initial movement of both pistons.

Figure 4:
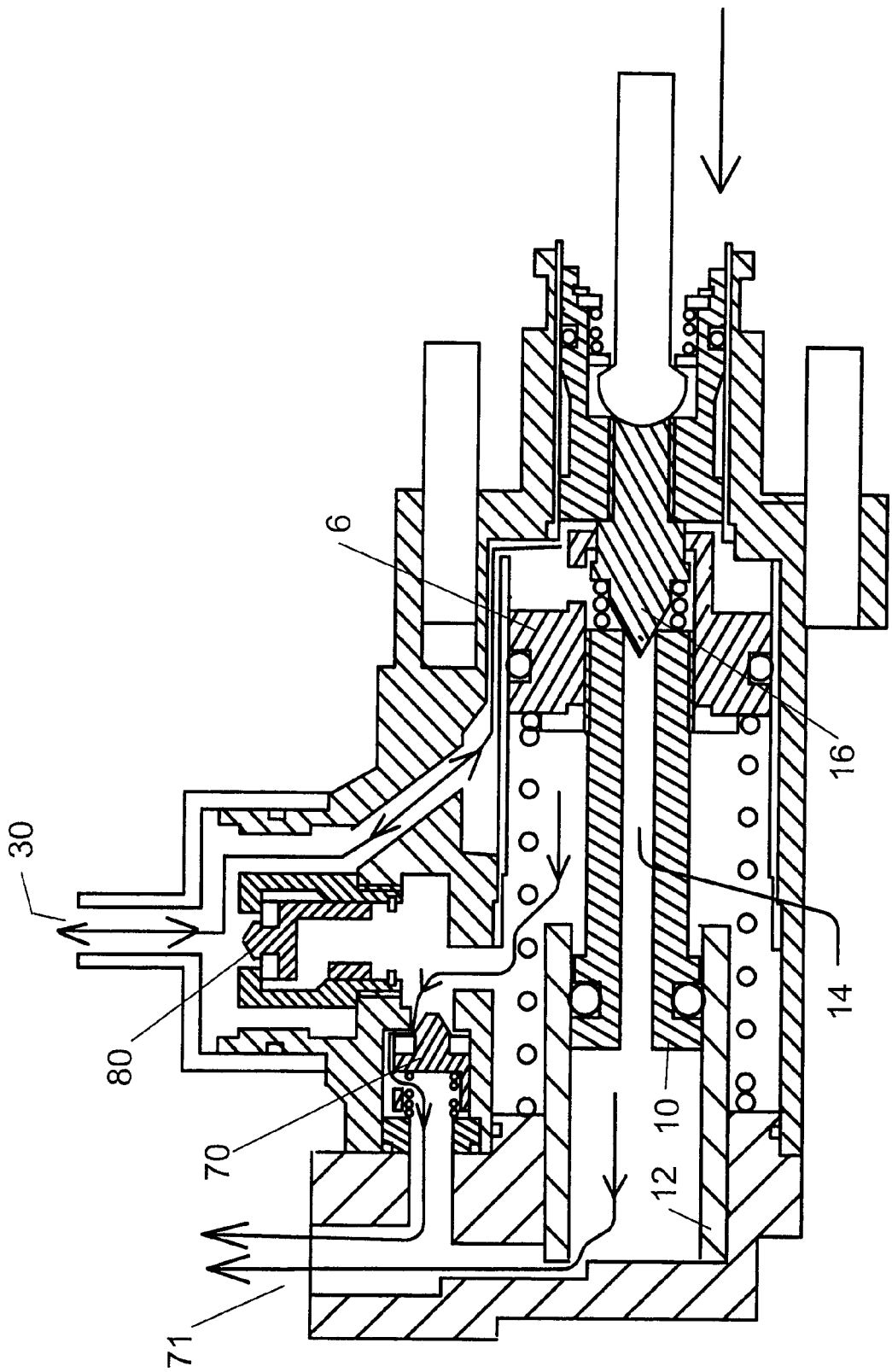
FIG. 4 is a horizontal section through the brake cylinder with the brake actuator continuing to move the piston assembly.

The operation of the two-stage master cylinder can be appreciated from a review of FIGS. 3 through 6. Initial movement of the push rod 20 to the left as indicated in FIG. 3 causes the needle valve 16 to seal with the open port 14 of the small piston 10. Further movement of the push rod 20 causes movement of the piston assembly and movement of the large piston 6 and the small piston 10. The hydraulic fluid pushed by the small piston 6 is open to the port 71 as shown in FIG. 4. The large piston 6 pushes hydraulic fluid through the valve 70 to the outlet 71. The large piston can be of a diameter of 1½ inches and the smaller piston of a diameter of approximately ¾ of an inch for example. A large amount of fluid is initially forced through the outlet 71 by the two pistons for movement of the piston cylinders at the brakes.

With this arrangement the amount of brake pedal travel to initially cause the brake piston to move the brake pads against the braking members is relatively low due to the combined area of the pistons. As can be appreciated, pressure will build within the master cylinder once the pistons at the brakes have moved the brake pads to engage the brake member. This occurs without excessive brake pedal travel as a relatively high volume is being displaced.

Figure 6:
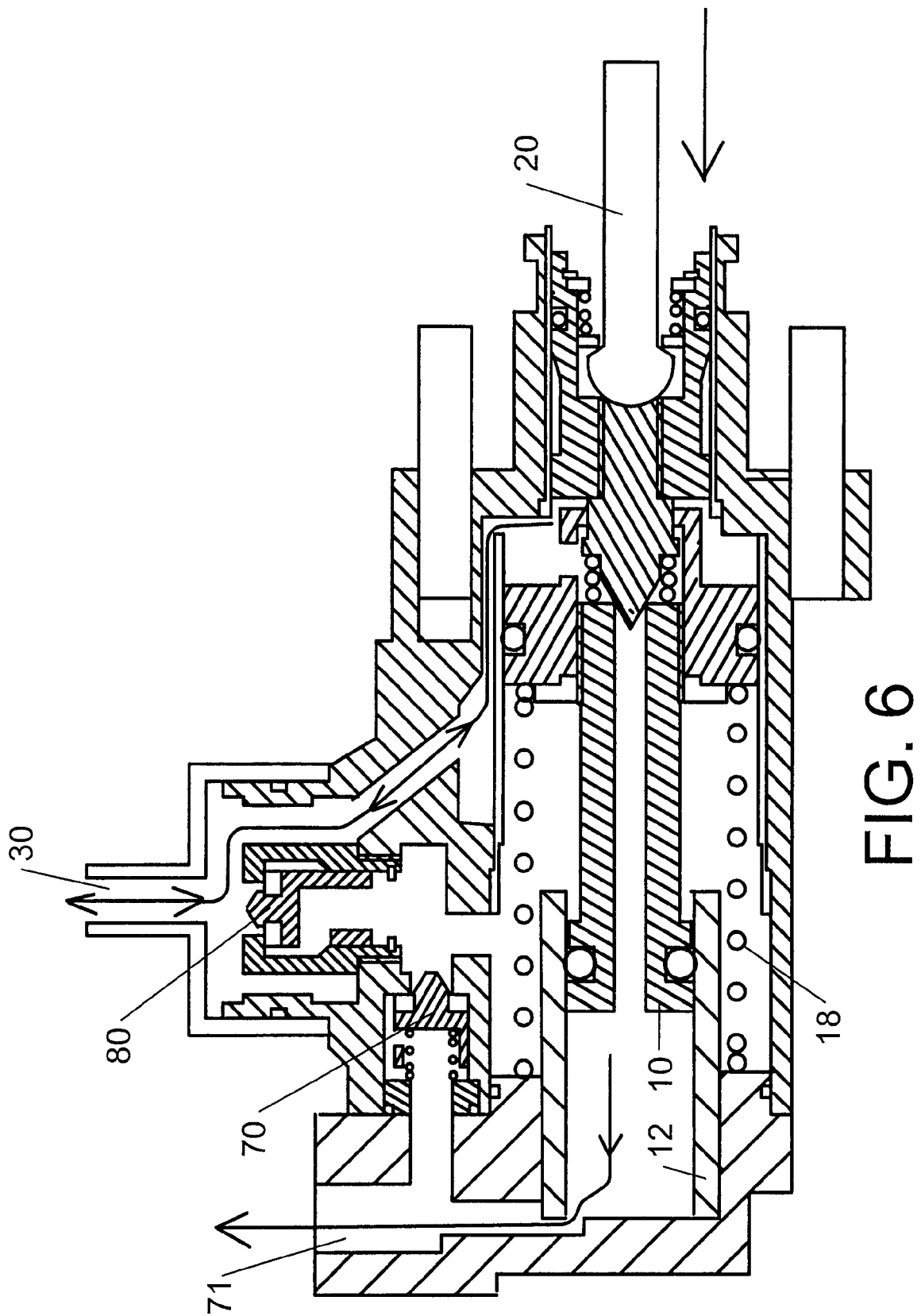
FIG. 6 is a horizontal section through the brake cylinder in the condition of FIG. 5.

Further pressure exerted on the push rod 20 by the operator is shown in FIGS. 5 and 6. The movement of the piston assembly 4 has caused a certain hydraulic brake fluid pressure to be present adjacent the outlet 71. This pressure acts on the head 41 of the bypass control valve 40. This pressure also acts on the rear face 48 of the small head 41. This pressure produces a bias force and if this force is sufficient, it moves the bypass control valve 40 towards the right overcoming the bias exerted by the spring 46 and assisted by the bias produced by the spring 42 to the left of the control valve.

FIG. 5 shows that the control valve has now moved and the hydraulic fluid under pressure by the large piston 6 is now allowed to vent to the reservoir along the fluid path shown in FIG. 5 unless the pressure associated with the large piston 6 exceeds the pressure at outlet 71. The hydraulic fluid passes through a small vent channel 62 having an adjustable restrictor 64. At this point the effect of the large piston 6 has been generally eliminated. Further movement of the push rod 20 is opposed by the small piston 10 and the hydraulic pressure exerted on the small piston. This provides better control for the user of the brakes and any additional brake pedal movement is not substantial as the brake pads have already been engaged. It can also be appreciated that adjustment of the adjusting spring 42, due to adjustment of the threaded case 39, can increase or decrease the force exerted by the spring 42 on the bypass control valve 40. This allows adjustment of the hydraulic pressure at which the control valve opens. The restrictor 64 provided in the channel 62 also allows an adjustable resistance with respect to the venting or the release of the pressure associated with the large piston 6. This restriction reduces a sudden or abrupt change when the large piston has now been effectively bypassed. Preferably the bypass control valve opens at a pressure between 50 and 60 PSI.

In FIGS. 5 and 6, the second stage i.e. the small piston alone, is now producing the hydraulic fluid pressure for further actuation of the brakes. With this arrangement, initial brake pedal movement causes both pistons to move and displace a large amount of brake fluid for the brake pistons. Once a certain pressure is reached, the brakes are normally controlled by the small piston. The action of the large piston and the bypass valve and valve 70 are dynamic and there are circumstances where the large piston can reconnect with the outlet port 71. For example, suddenly jamming on the brakes can reactivate the large piston that was previously bypassed.

Figure 7:
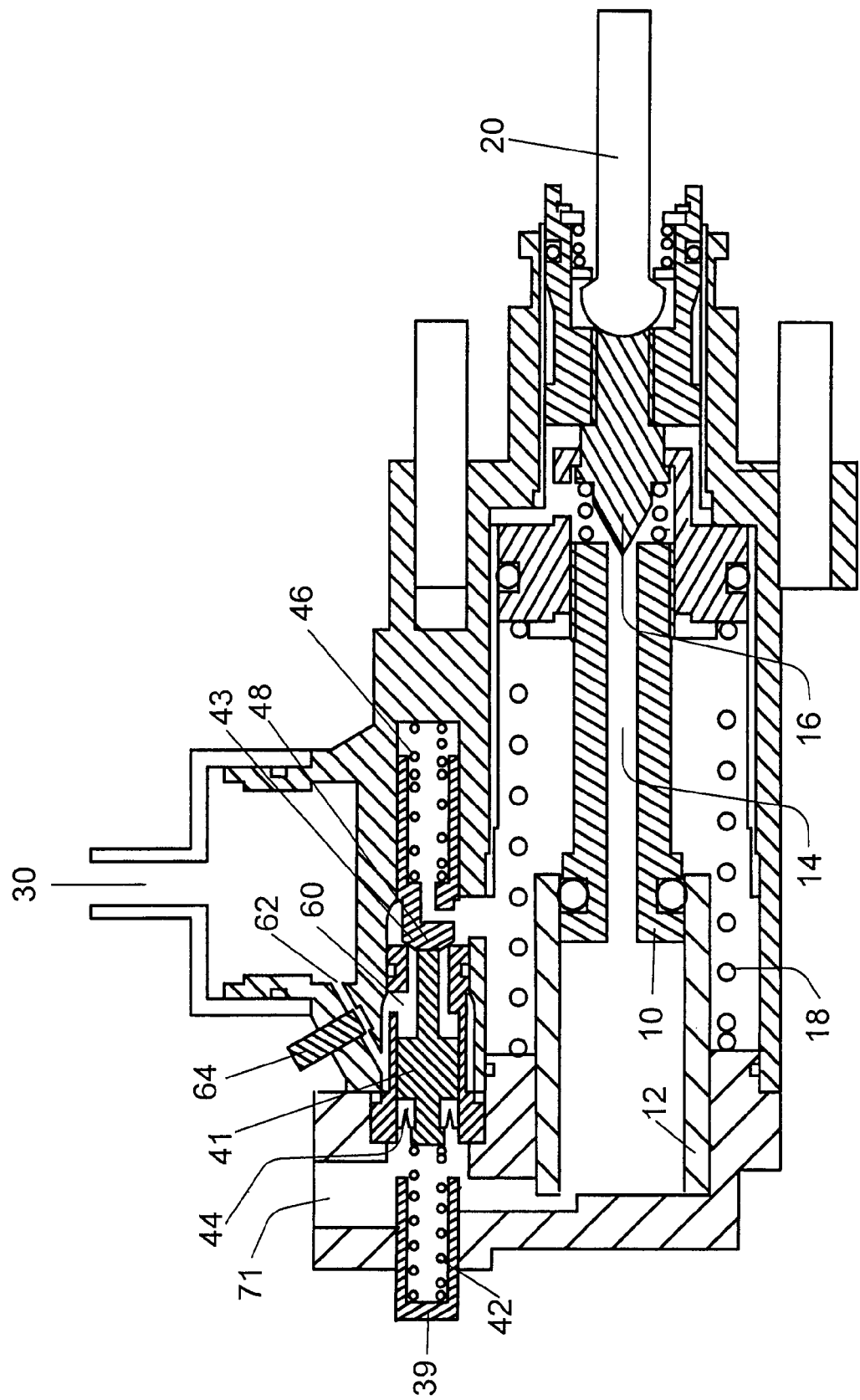
FIG. 7 is a vertical section through the master cylinder with the brake actuator being moved to a non-operative position.
Figure 8:
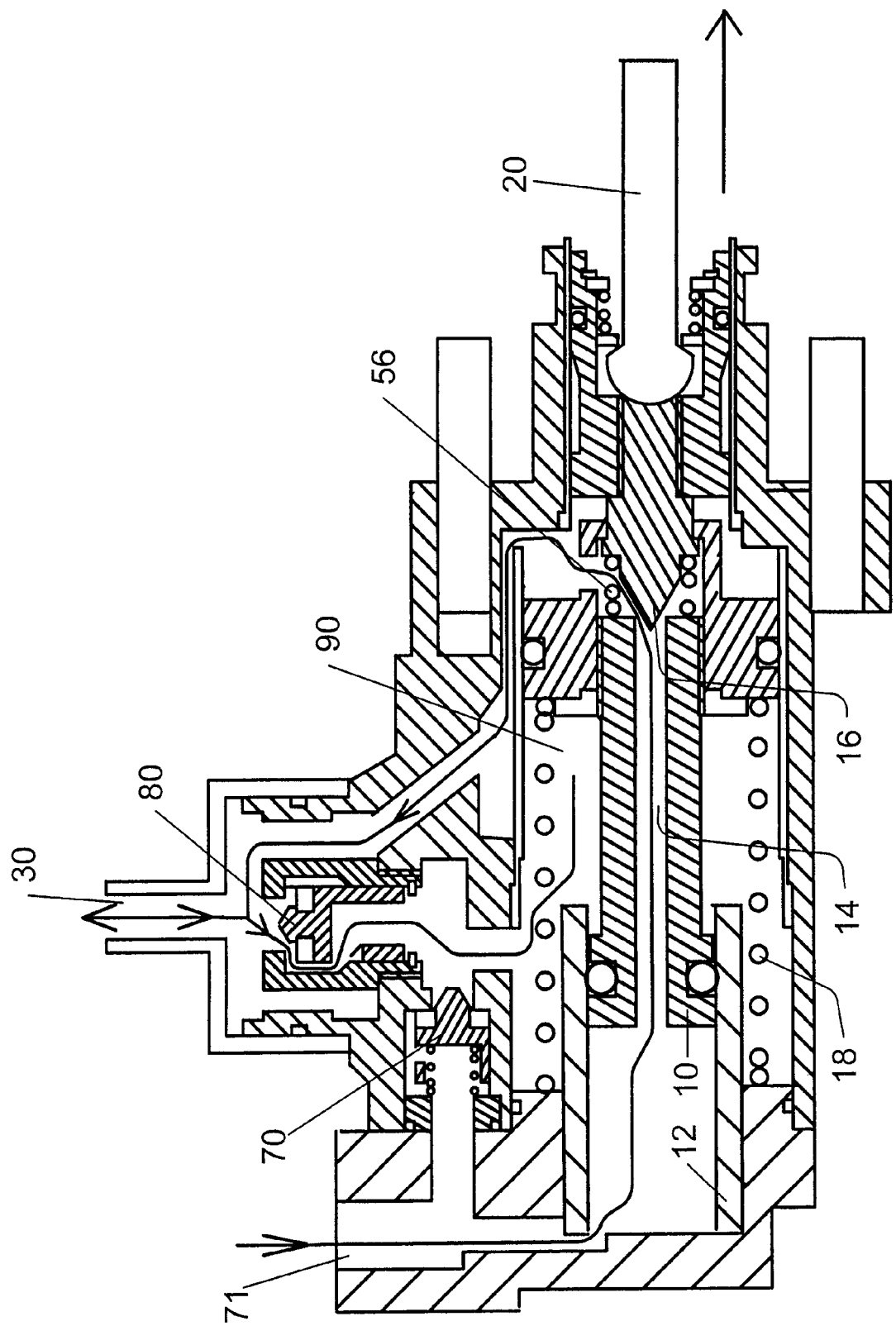
FIG. 8 is a horizontal section through the brake cylinder in the condition of FIG. 7.

FIGS. 7 and 8 show the master cylinder when the braking force exerted on the push rod 20 has been removed. In this case the needle valve 16 has moved under the force of its spring and the pressure differential to a clear position and hydraulic fluid can vent through the open port 14 of the small piston 10. The large piston is returned to an initial position as shown in FIG. 7 due to the biasing force exerted on it by spring 18. Brake fluid is provided to chamber 90 associated with the large piston 6 through the valve element 80 which has now moved to a clear position as movement of the large piston creates a low pressure on that valve element.

With the present arrangement a large volume of hydraulic brake fluid is initially provided through the outlet port 71 by the combination of the large piston 6 and the small piston 10. At a certain pressure that is adjustable by the operator the action of the large piston is generally eliminated by the movement of a bypass control valve. The second stage of the master brake cylinder continues to act due to the influence of the brake actuator, in this case push rod 20, the position of the small piston 10. Typically the brake pads engaging a braking member cause a build up in pressure sufficient to bypass the large piston.

As can be appreciated variations of this two-stage master cylinder can use different ratios of the large piston 6 to the small piston 10. This allows for further variation. Preferably the cylinders in which these pistons slide are releasably secured in the body housing 5 of the master cylinder and are easily interchanged.

An alternate two-stage master cylinder 102, shown in FIGS. 9 through 18, includes a piston assembly 104 having a large piston 106 and a smaller piston 110. The large piston 106 slides within cylinder 108 and the smaller piston 110 slides within cylinder 112.

Figure 9:
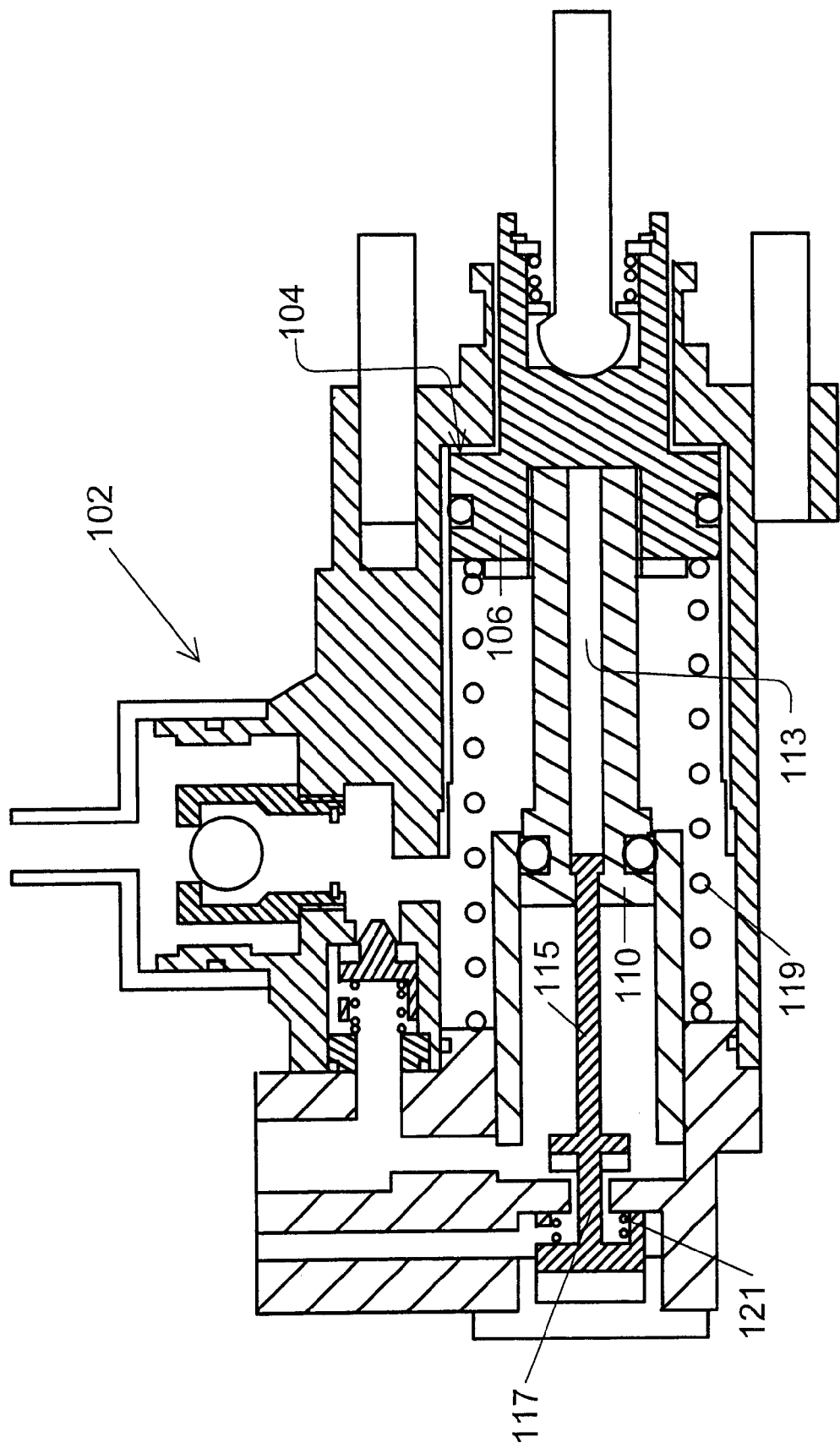
FIG. 9 is a sectional view through an alternate two stage master cylinder showing a variation of the master cylinder with a compensating valve replacing the needle valve.

A push rod actuator 120 is connected to the brake pedal by a linkage (see FIG. 19) and applies a force against the large piston 106. The small piston 110 includes a longitudinally extending chamber 113 that receives the stem 115 of the compensating valve 117 provided at one end of the master cylinder 102. The compensating valve 117 shown in FIG. 9 is in a release position as the stem 115 is controlled by the small piston 110 and moved to the release position. The piston return spring 119 draws both the large piston 106 and the small piston 108 to the release position. Compensating valve 117 includes a spring 121 which is being compressed. The stem 115 includes a shoulder region located within the chamber 113 of the small piston. The stem 115 is slideable within the chamber 113.

Figure 10:
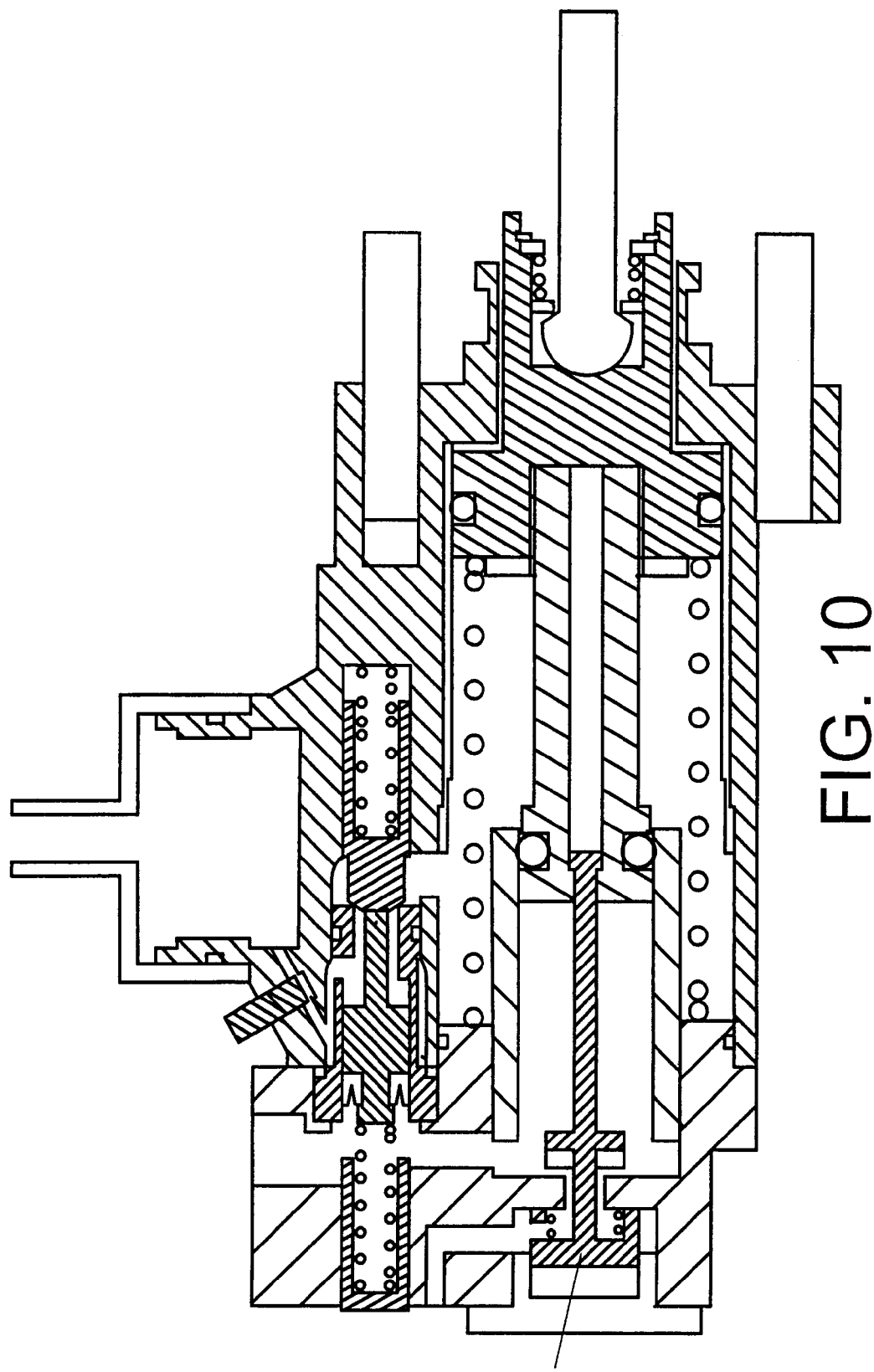
FIG. 10 is a further sectional view through the alternate master cylinder showing details of the bypass control valve.

In FIG. 10, details of the bypass valve are shown with the bypass valve being in a closed position and the compensating valve 117 also being in an open position.

Figure 11:
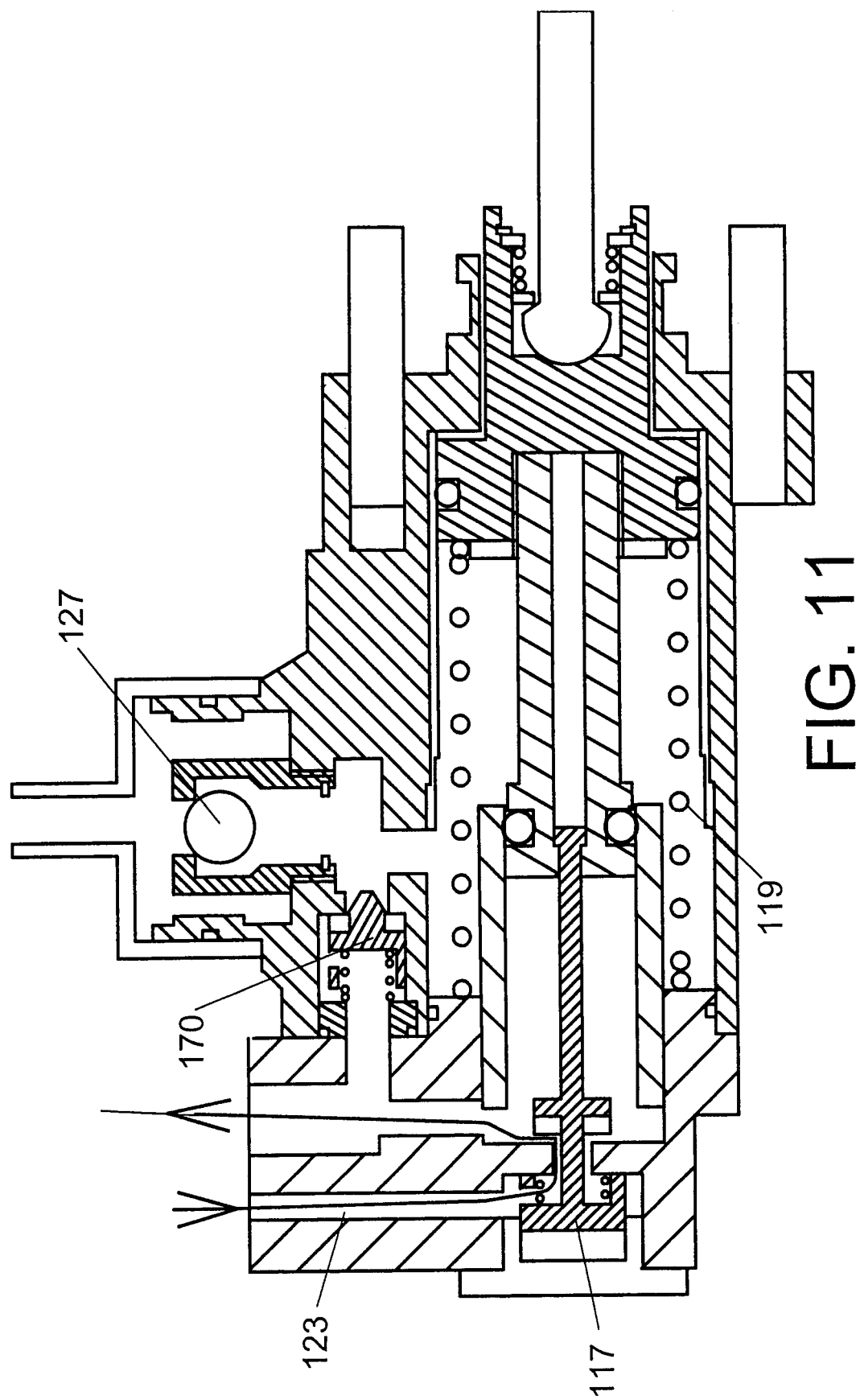
FIG. 11 is a sectional view through the alternate two stage master cylinder with the pistons in a non-braking application.

As can be seen from a review of FIG. 11, the compensating valve 117 allows fluid from the caliper to be returned to the reservoir through the passage 123 when the compensating valve is open. The large piston is also in communication with the reservoir if the check valve indicated by the ball 127 is in a release position. This path provides additional fluid required to compensate for movement of the large piston when the brake is released. Brake fluid is returned from the calipers as shown in FIG. 11, through the compensating valve 117 as the valve 170 is closed. The check valve 127 can move to an open position to allow the large piston to return under the bias of spring 119.

Figure 12:
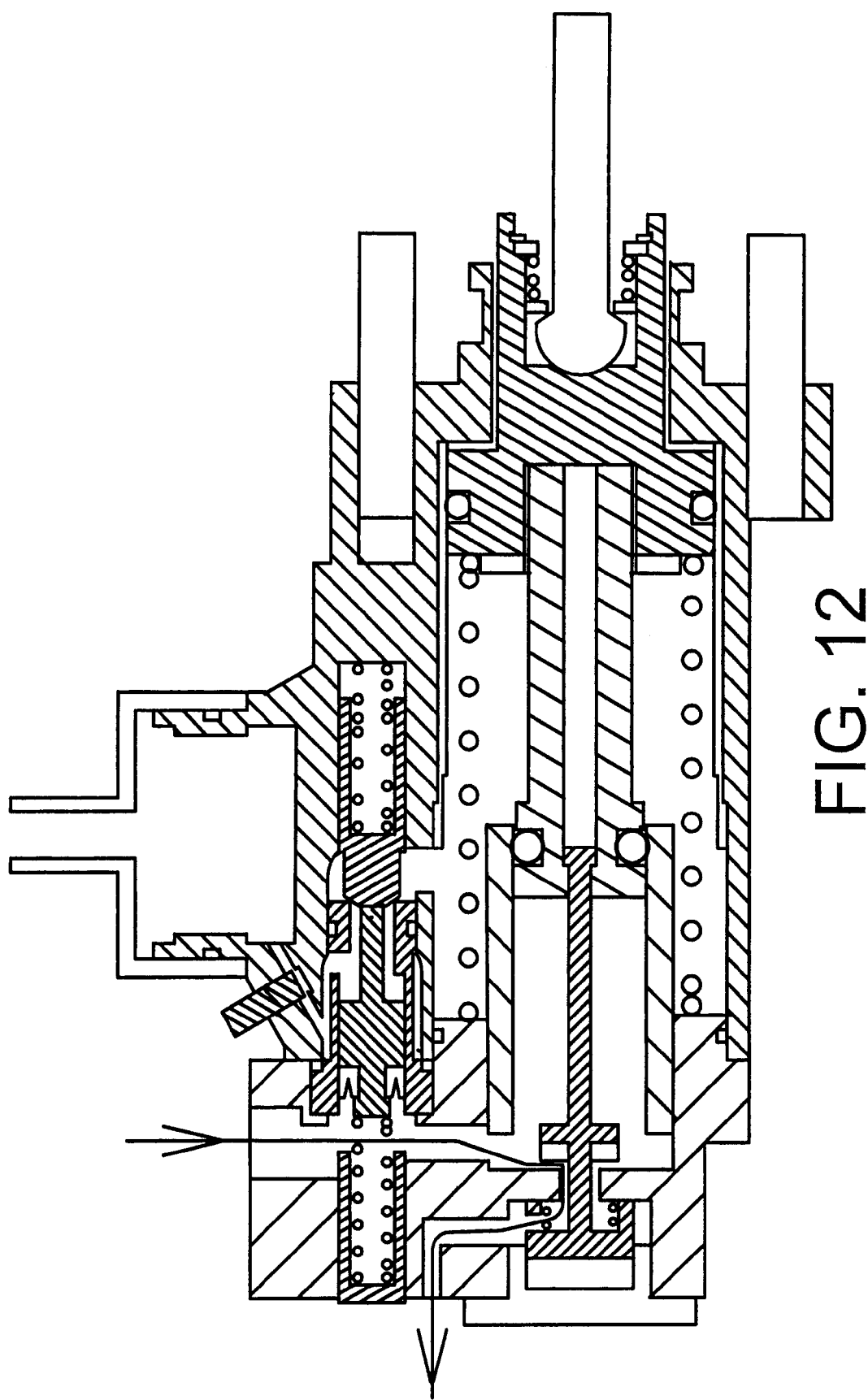
FIG. 12 is a sectional view through the alternate master cylinder showing details of the bypass control valve with the pistons in a non-braking position.

The check valve ball 127 is preferably made of a UHMW (ultra high molecular weight) polyethylene that is buoyant in brake fluid and floats. With the check valve orientated as shown in FIG. 12, the check valve ball 127 will float to the closed position and opens based on a pressure differential across the check valve ball. If a different orientation is used a light spring can be used to bias the check valve ball to the closed position.

FIG. 12 shows further details of the compensating valve.

Figure 13:
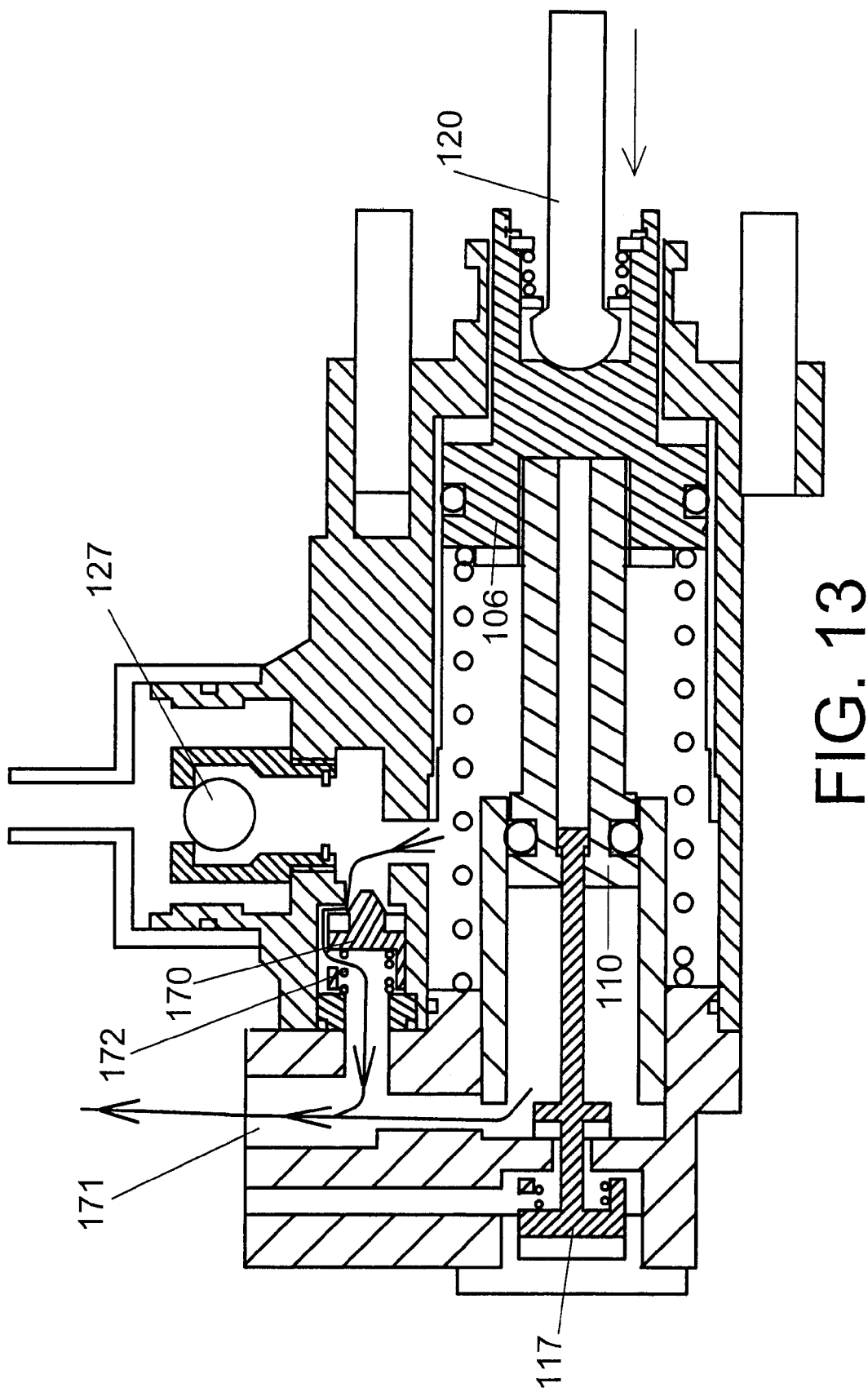
FIG. 13 is a sectional view through the alternate master cylinder with the pistons initially providing hydraulic fluid to the brake caliper for braking.

The operation of the two stage master cylinder can be appreciated from a review of FIG. 13. The push rod 120 forces the large piston 106 and the small piston 110 from right to left. Fluid is forced towards the caliper through the outlet 171 and the compensating valve 117 moves to a closed position (due to the spring bias). The brake fluid associated with the large piston 106 has caused the check valve 127 to move to a closed position isolating the large piston from the reservoir. Brake fluid is forced through the valve 170 as it is able to overcome the spring bias associated with the small spring 172.

Figure 14:
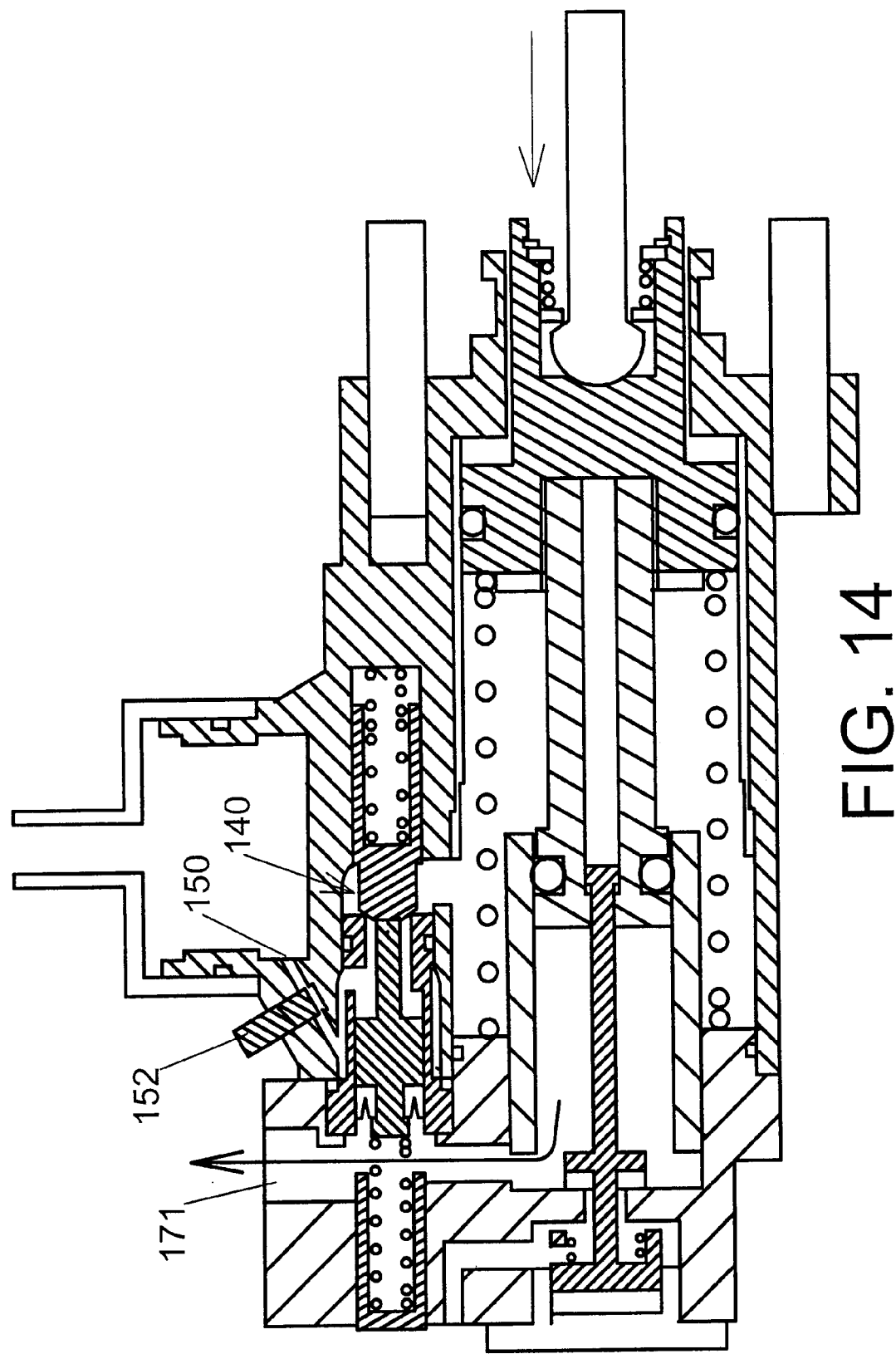
FIG. 14 is a sectional view through the alternate master cylinder with the bypass control valve shown and the pistons in an initial braking application.
Figure 15:
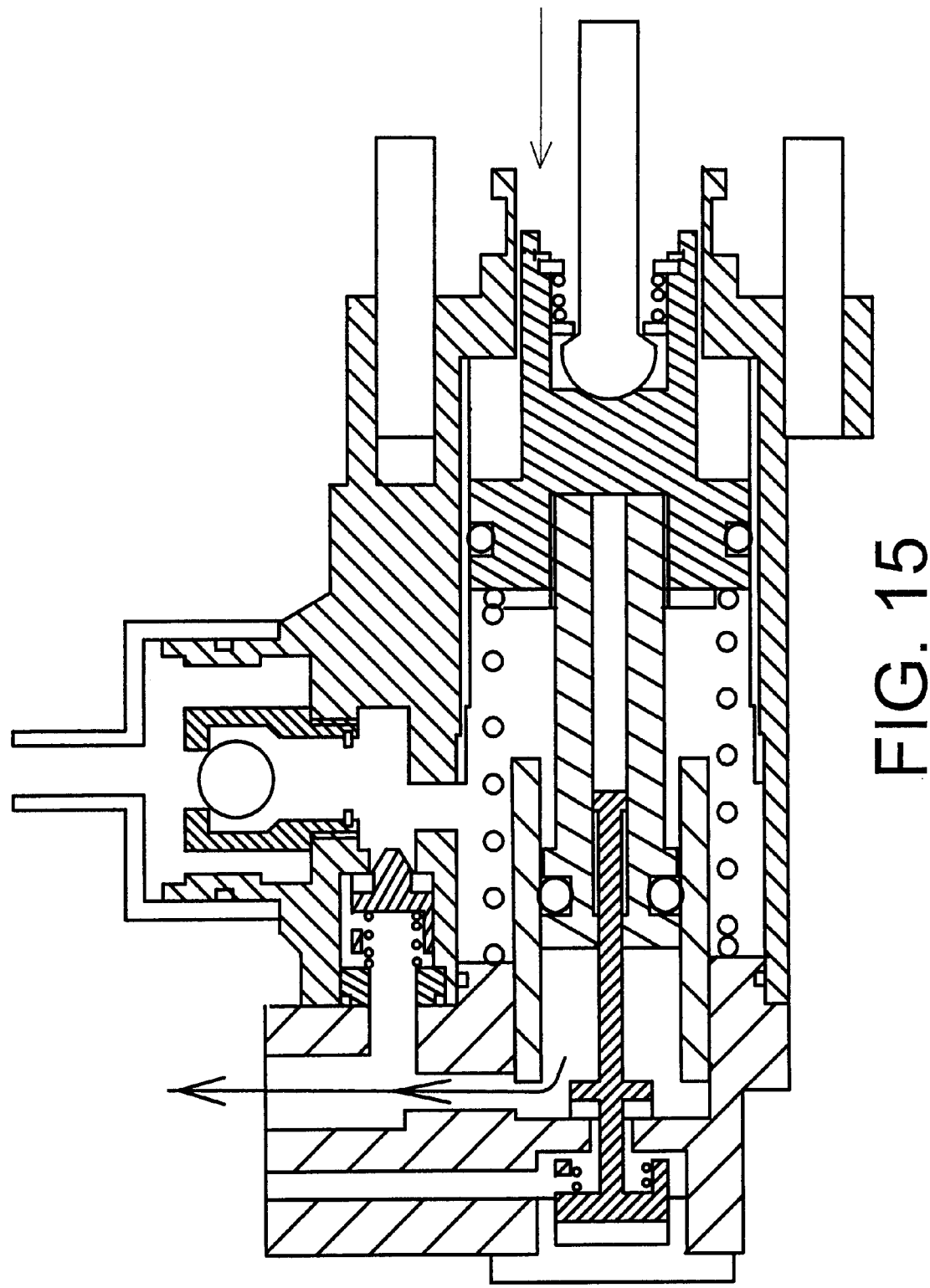
FIG. 15 is a sectional view through the alternate master cylinder where only the small diameter piston is continuing to apply pressure to the brake caliper.
Figure 16:
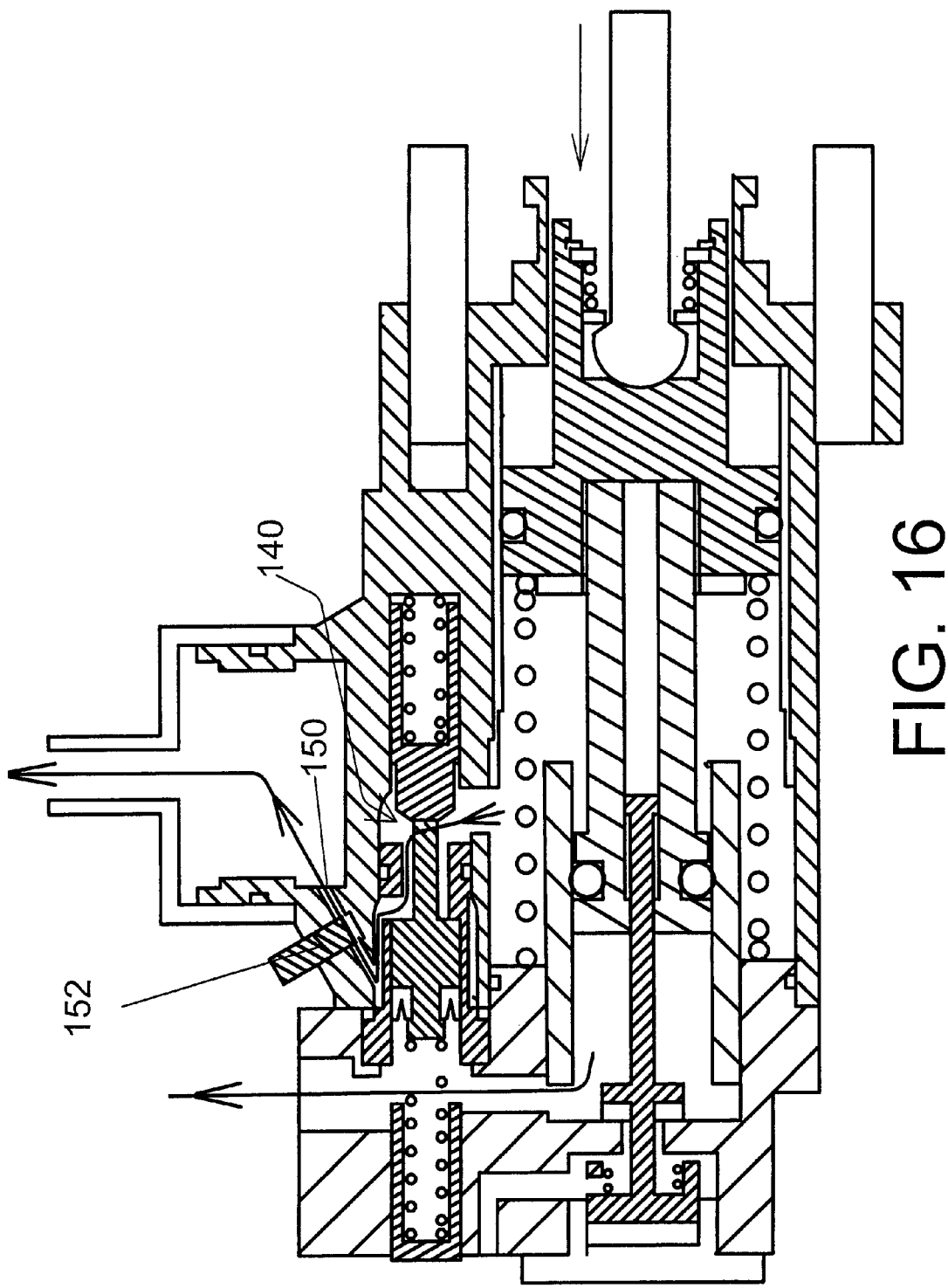
FIG. 16 is a view similar to FIG. 15 but showing the blow-off valve whereby the large piston is effectively in communication with the reservoir through the modulator valve.

In FIG. 14 it can be seen that the bypass valve remains in the closed position as fluid is being provided to the brake pistons and pressure is only starting to build between the master cylinder pistons and the brake pistons. Once the brakes engage the caliper, pressure within the master cylinder (i.e. at outlet 171) builds and at a desired pressure, for example 50 PSI, the bypass valve 140 will open as indicated in FIG. 16. At this point in time further movement of the large piston generally causes fluid associated therewith to return to the reservoir through the vent path 150 having the modulator valve 152. The small piston continues to provide fluid to the brake caliper and the second stage of the master cylinder is effectively being used. An operator will require less force to continue movement of the brake pedal.

Figure 17:
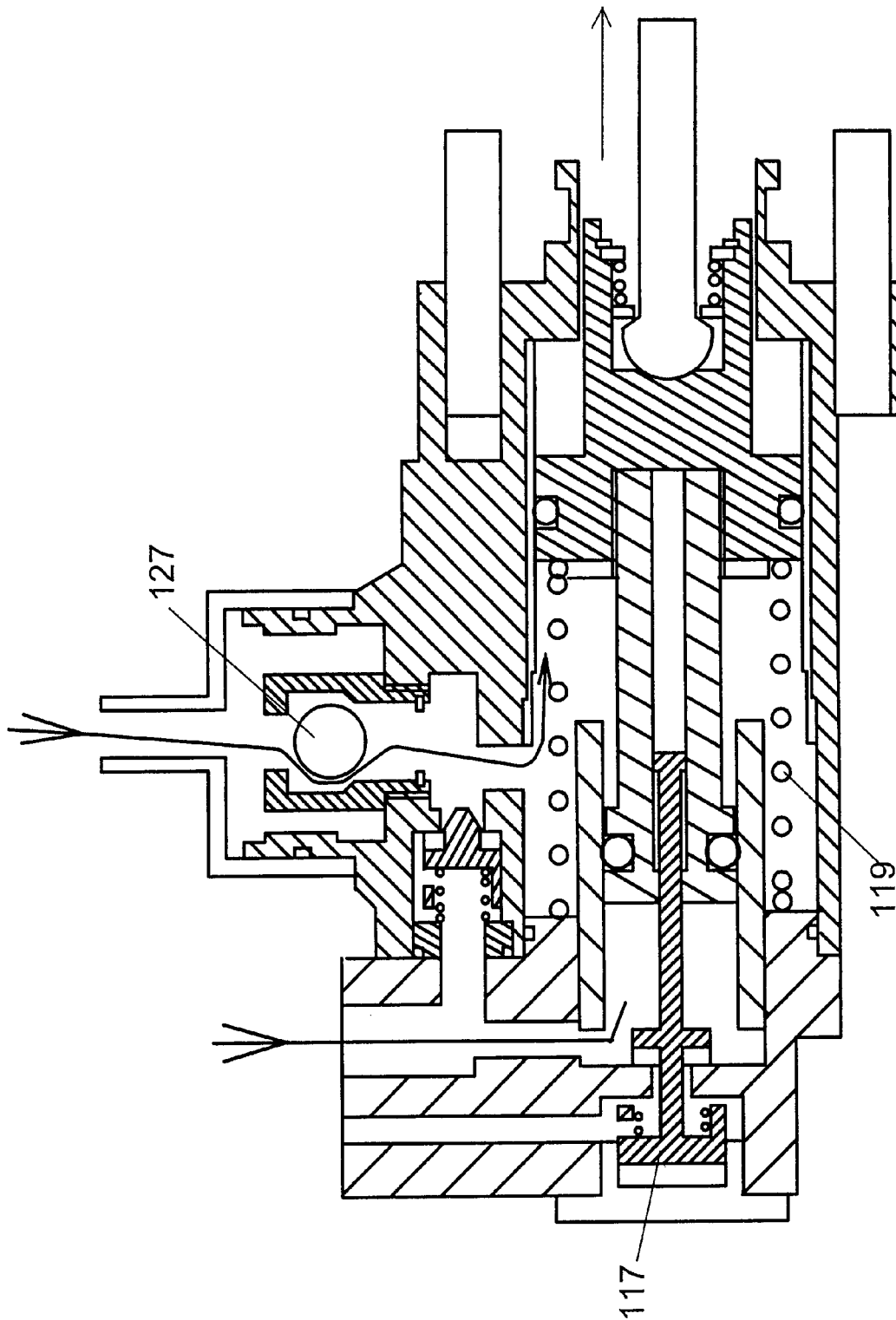
FIG. 17 shows details of the return of fluid to the secondary piston chamber and the larger piston chamber when pressure is released from the brake pedal.

FIG. 17 shows the alternate master cylinder when the brake pedal is released. Brake fluid is returned to the front face of the small piston 110 and in cooperation with the return spring 119, forces the actuating rod to move as indicated in the drawing. The compensating valve 117 remains closed due to pressure in front of the small piston. Brake fluid returning from the caliper is also at a pressure higher than the pressure on the side of valve 117 exposed to the large piston and as such that valve is closed. With movement of the small piston and large piston to the right as indicated, additional fluid is provided to the operating face of the large piston as the check valve 127 has opened.

FIG. 18 shows a brake caliper 200 having opposed brake pads 204 and 206 for engaging a disc brake. The one brake pad 204 is connected to the actuating piston 208. The brake pad 204 includes a support plate 210 as the size of the piston 212 is somewhat large. The piston 212 is moveable within the piston chamber 214 of the caliper. The piston 212 cooperates with a piston outer ring 216. This piston outer ring 216 moves within the cylinder 214 and includes an o-ring seal 218. The piston outer ring includes a shoulder 220 which contacts a wave washer 222 that in turn engages the split sleeve 224. The wave washer 222 provides a preset return distance or retraction distance of the piston outer ring 216 relative to the split sleeve 224. The split sleeve 224, when pushed forward due to movement of the piston, effectively locks with the cylinder 214 and compensates for wear of the brake pads. The wave washer 222 provides a preferred positive preset retraction of the brake pad as the piston will return a preset distance and clear the brake member (disc, brake drum, etc) reducing drag and increasing fuel efficiency.

It has been found that a particular relationship between the effective size of the pistons of the master cylinder and the size of the pistons of the brake pads is desirable. There is a preferable 4:1 ratio of area whereby the brake pads may be positively retracted from the disc brake. The positive retraction is effectively provided by the wave washer, and while providing positive retraction, restricts or compensates for the wear of the brake pads.

Figure 19:
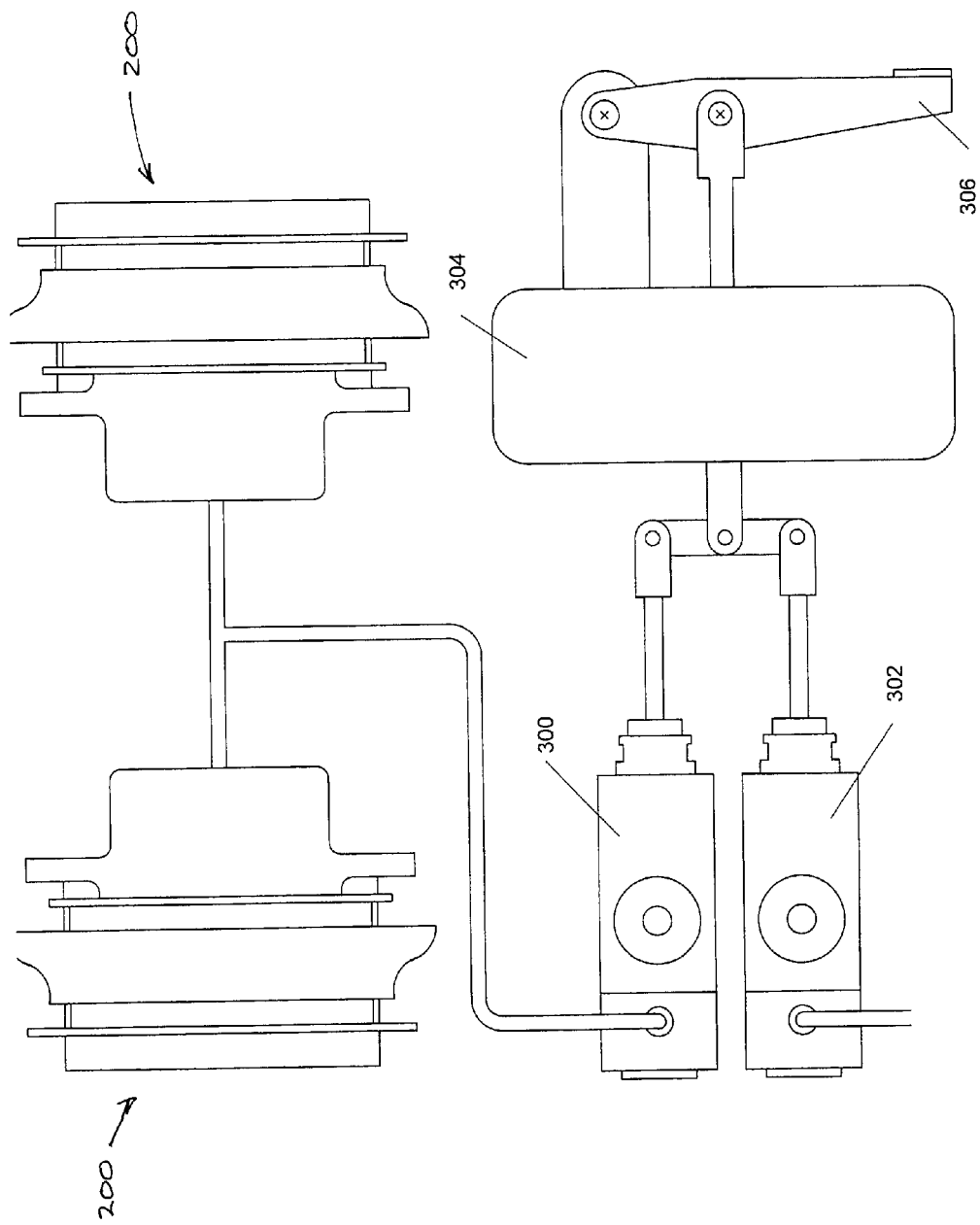
FIG. 19 shows a schematic of a braking system using a pair of two stage master cylinders.

A further preferred embodiment of the invention is shown in FIG. 19 where two master cylinders 300 and 302 are shown connected to a common linkage associated with a vacuum booster 304 which is in turn connected to the brake actuator 306. One of the two stage master cylinders operates to control the front disc brakes and the second master cylinder 302 is connected to the rear brakes.

Although preferred embodiments of the invention have been described here in detail it will be understood by those skilled in the art that variations may be made thereto without departing from the spirit of the invention and scope of the appended claims.

The embodiments of the invention in which an exclusive property or privilege is claimed are defined as follows:

1. A two stage master cylinder comprising a primary piston, a secondary piston, a push actuator mechanically engaging said primary piston and pushing both pistons for moving said pistons to create a hydraulic fluid flow and pressure at a power outlet of said master cylinder; and a by-pass control valve for opening a venting outlet associated with said primary piston upon actuation of said master cylinder and the pressure of the hydraulic fluid at said power outlet reaching a predetermined pressure; and wherein said master cylinder includes a first stage where both said primary and secondary pistons move with said push actuator to displace hydraulic fluid through said power outlet and a second stage where both said primary and secondary pistons continue to be displaced by said push actuator and movement of said secondary piston determines the amount of hydraulic fluid displaced through said power outlet; wherein said by-pass control valve includes an adjustable spring bias allowing adjustment of said predetermined pressure; and wherein said venting outlet includes a vent channel sized to throttle the venting of hydraulic fluid with said vent channel including an adjustable throttling valve.

2. A two stage master cylinder as claimed in claim 1 including a make-up valve connected to a hydraulic fluid reservoir; said make-up valve opening and providing hydraulic fluid to a front face of the secondary piston during a retraction movement of said secondary piston of providing make-up hydraulic fluid; said make-up valve closing upon movement of said secondary piston in a braking actuation.

3. A two stage master cylinder as claimed in claim 2 wherein said make-up valve is spring loaded to a closed position and opens in response to a hydraulic pressure differential across said make up valve biasing the valve to open.

4. A two stage master cylinder as claimed in claim 3 wherein said primary piston includes a further make-up hydraulic fluid valve that opens and provides make-up hydraulic fluid to said primary piston during a retraction movement of said primary piston.

5. A two stage master cylinder as claimed in claim 4 in combination with at least one caliper brake, and each caliper brake is piston actuated and said master cylinder provides hydraulic fluid for operating said at least one caliper brake.

6. A two stage master cylinder as claimed in claim 5 wherein said at least one caliper brake is two caliper brakes.

7. A two stage master cylinder as claimed in claim 5 wherein said at least one caliper brake includes positive retraction of brake pads of said at least one brake to a position clear of a brake disk rotor to reduce drag force.

8. A two stage master cylinder as claimed in claim 1 wherein said primary piston and said secondary piston are fixed to each other and move together during a brake actuation movement and a retraction actuation movement of said pistons.

* * * * *